(12) United States Patent
Tang et al.

(10) Patent No.: US 11,016,327 B2
(45) Date of Patent: May 25, 2021

(54) SCREEN ASSEMBLY AND ELECTRONIC DEVICE

(71) Applicant: GUANGDONG OPPO MOBILE TELECOMMUNICATIONS CORP., LTD., Guangdong (CN)

(72) Inventors: Yimei Tang, Guangdong (CN); Jiao Cheng, Guangdong (CN); Zhibin Ouyang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/951,430

(22) Filed: Nov. 18, 2020

(65) Prior Publication Data

US 2021/0072587 A1 Mar. 11, 2021

Related U.S. Application Data

(63) Continuation-in-part of application No. PCT/CN2018/092891, filed on Jun. 26, 2018.

(51) Int. Cl.
*G02F 1/1335* (2006.01)
*F21V 8/00* (2006.01)
(Continued)

(52) U.S. Cl.
CPC ..... *G02F 1/133512* (2013.01); *G02B 6/0086* (2013.01); *G02F 1/1339* (2013.01);
(Continued)

(58) Field of Classification Search
CPC ................................................ G02F 1/133512
See application file for complete search history.

(56) References Cited

U.S. PATENT DOCUMENTS

| 2016/0161664 | A1 | 6/2016 | Ishida et al. | |
| 2017/0187934 | A1* | 6/2017 | Kwak | G02F 1/133512 |
| 2019/0278132 | A1* | 9/2019 | Nakamura | G02B 5/3075 |

FOREIGN PATENT DOCUMENTS

| CN | 203217510 U | 9/2013 |
| CN | 103458073 B | 12/2015 |

(Continued)

OTHER PUBLICATIONS

International search report and English Translation issued in corresponding international application No. PCT/CN2018/092891 dated Jan. 29, 2019.

(Continued)

*Primary Examiner* — Edmond C Lau

(57) ABSTRACT

A screen assembly and an electronic device are provided according to the disclosure. The screen assembly includes a backlight module, a display panel, a cover plate, and a camera module. The cover plate, the display panel, and the backlight module are stacked in sequence. The backlight module defines a mounting through hole for at least partially receiving the camera module. A first ink layer is sandwiched between the backlight module and the display panel. A second ink layer is sandwiched between the display panel and the cover plate. The first ink layer and the second ink layer cooperate with each other to block light leakage of the display panel and the backlight module toward the camera module.

20 Claims, 13 Drawing Sheets

(51) Int. Cl.
  *G02F 1/1333* (2006.01)
  *G02F 1/1339* (2006.01)
  *G02F 1/1343* (2006.01)
  *G02F 1/1362* (2006.01)

(52) U.S. Cl.
  CPC .. *G02F 1/133308* (2013.01); *G02F 1/133514* (2013.01); *G02F 1/133528* (2013.01); *G02F 1/134309* (2013.01); *G02F 1/136286* (2013.01); *G02F 1/13332* (2021.01); *G02F 2201/121* (2013.01); *G02F 2201/123* (2013.01); *G02F 2202/28* (2013.01)

(56) References Cited

FOREIGN PATENT DOCUMENTS

| | | |
|---|---|---|
| CN | 206470649 U | 9/2017 |
| CN | 107272242 A | 10/2017 |
| CN | 107784989 A | 3/2018 |
| CN | 207352317 U | 5/2018 |
| KR | 20120021608 A | 3/2012 |

OTHER PUBLICATIONS

Extended European search report issued in corresponding European application No. 18924335.5 dated Mar. 12, 2021.

* cited by examiner

SCREEN ASSEMBLY AND ELECTRONIC DEVICE

CROSS-REFERENCE TO RELATED APPLICATION(S)

This application is a continuation-in-part of International Application No. PCT/CN2018/092891, filed on Jun. 26, 2018, the disclosure of which is hereby incorporated by reference in its entirety.

TECHNICAL FIELD

This disclosure relates to the technical field of electronics, and more particularly, to a screen assembly and an electronic device.

BACKGROUND

An electronic device with a high screen-to-body ratio has a greater proportion of display region and provides users with a better experience. Currently, research and development in increasing the screen-to-body ratio of the electronic device are conducted by mainstream manufacturers. In order to obtain a higher screen-to-body ratio, when defining a hole in a screen for mounting a camera module, the hole is designed to have a small diameter. However, the size of the hole affects the field of view of the camera module. That is, the hole with a decreased diameter will block the field of view and thereof affect shooting of the camera module.

SUMMARY

A screen assembly is provided according to the disclosure. The screen assembly includes a backlight module, a display panel, a cover plate, and a camera module. The cover plate, the display panel, and the backlight module are stacked in sequence. The backlight module defines a mounting through hole for at least partially receiving the camera module. A first ink layer is sandwiched between the backlight module and the display panel. A second ink layer is sandwiched between the display panel and the cover plate. The first ink layer and the second ink layer cooperate with each other to block light leakage of the display panel and the backlight module toward the camera module.

A screen assembly is further provided according to the disclosure. The screen assembly includes a backlight module, a display panel, a cover plate, and a camera module. The display panel includes a display region. The backlight module and the camera module are disposed corresponding to the display region. The backlight module defines a mounting through hole. The camera module partially extends through the mounting through hole. The screen assembly further includes a first ink layer and a second ink layer. The first ink layer is configured to block light leakage of the backlight module and the display panel toward the camera module. The second ink layer is configured to block light leakage of the display panel toward the camera module.

An electronic device is further provided according to the disclosure. The electronic device includes the above-mentioned screen assembly.

BRIEF DESCRIPTION OF DRAWINGS

To describe technical solutions in the implementations of the disclosure more clearly, the following briefly introduces the accompanying drawings required for describing the implementations. Apparently, the accompanying drawings in the following description merely illustrate some implementations of the disclosure. Those of ordinary skill in the art may also obtain other accompanying drawings based on these provided herein without creative efforts.

DETAILED DESCRIPTION

Technical solutions in implementations of the disclosure are clearly and completely described in the following with reference to the accompanying drawings. Apparently, the described implementations are merely a part of rather than all of the implementations of the disclosure. All other implementations obtained by those of ordinary skill in the art based on the implementations provided herein without creative efforts shall fall within the scope of the disclosure.

Figure 1A:
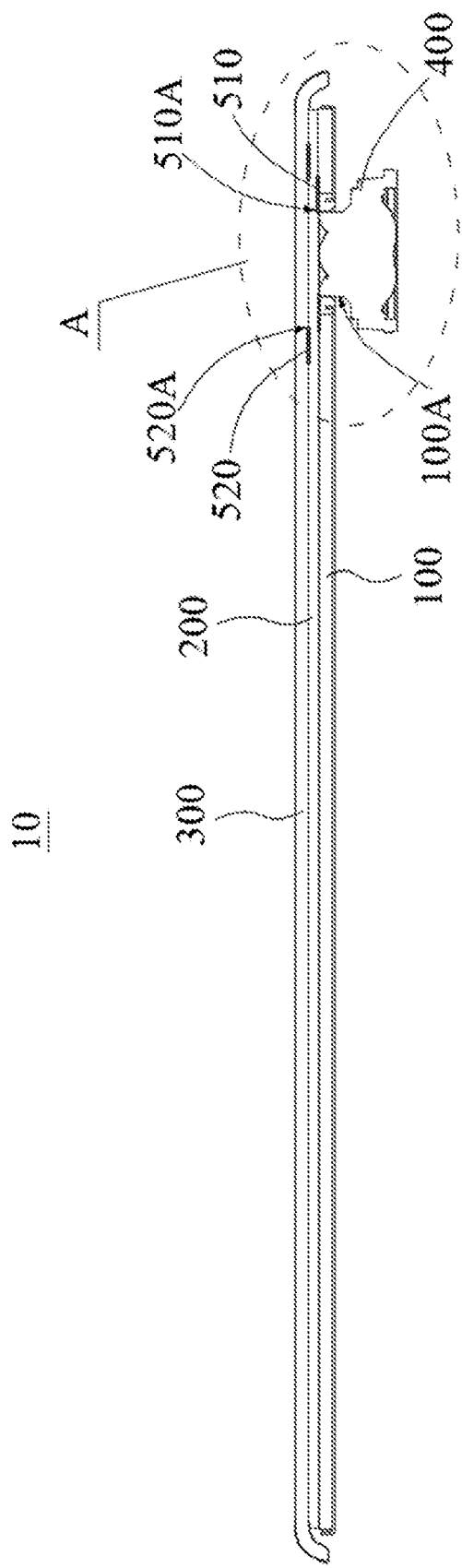
FIG. 1A is a schematic structural view of a screen assembly according to an implementation of the disclosure.
Figure 1B:
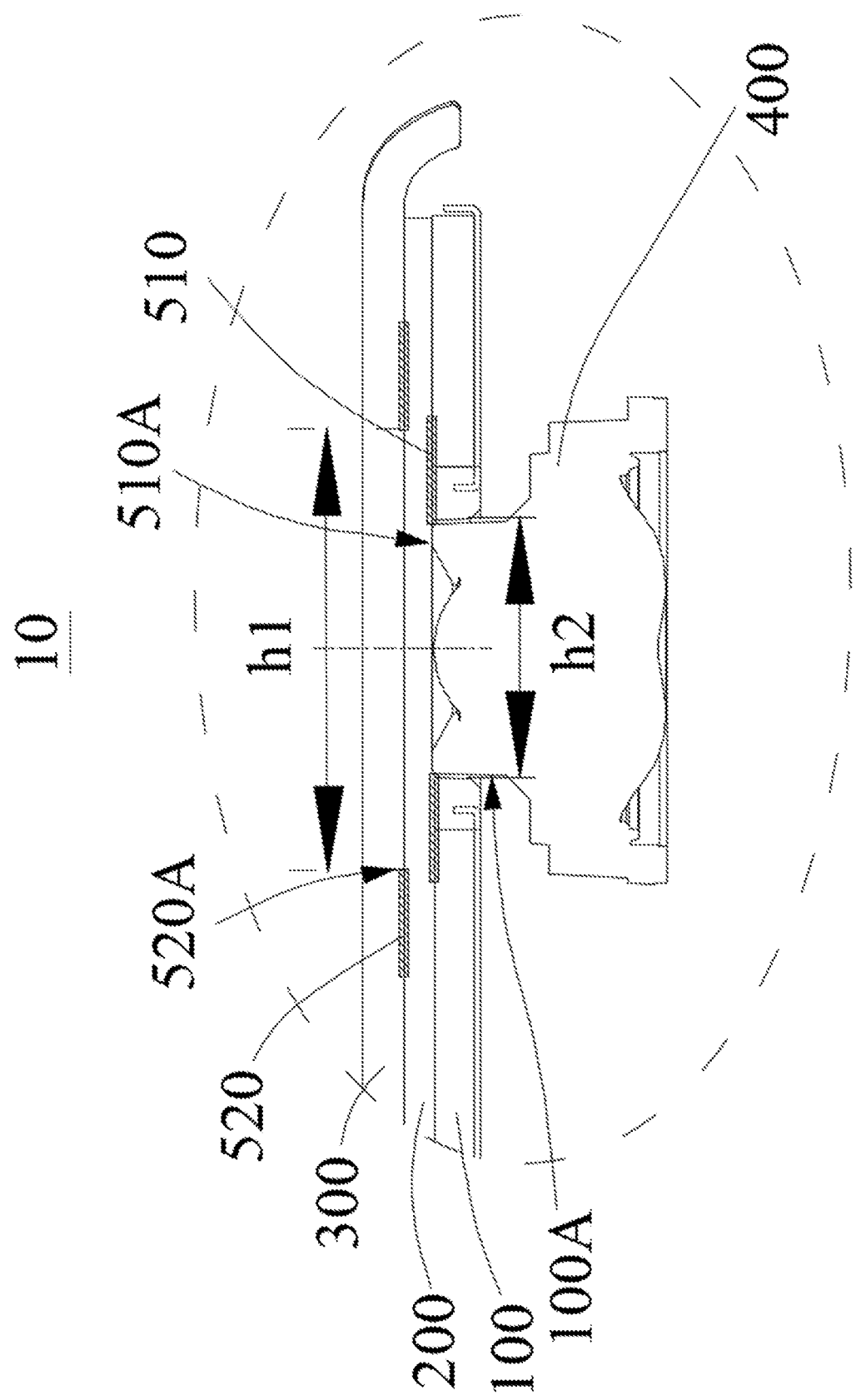
FIG. 1B is an enlarged schematic view of region A illustrated in FIG. 1A.

FIG. 1A is a schematic structural view of a screen assembly according to an implementation of the disclosure, FIG. 1B is an enlarged schematic view of region A illustrated in FIG. 1A. In this implementation, the screen assembly includes a backlight module 100, a display panel 200, a cover plate 300, and a camera module 400. The cover plate 300, the display panel 200, and the backlight module 100 are stacked in sequence. The backlight module 100 defines a mounting through hole 100A for at least partially receiving the camera module 400. A first ink layer 510 is sandwiched between the backlight module 100 and the display panel 200. A second ink layer 520 is sandwiched between the display panel 200 and the cover plate 300. The first ink layer 510 and the second ink layer 520 cooperate with each other to block light leakage of the display panel 200 and the backlight module 100 toward the camera module 400.

In an implementation, the display panel 200 is a liquid crystal display panel. The camera module 400 is a front camera.

In an implementation, the first ink layer 510 and the second ink layer 520 are used for blocking transmission of light.

In an implementation, the first ink layer 510 defines a first through hole 510A. The camera module 400 extends through the first through hole 510A and is attached to an inner wall of the first through hole 510A. In this implementation, when the inner wall of the first through hole 510A of the first ink layer 510 is attached to the camera module 400, it is possible to sufficiently block the light leakage of the backlight module 100 toward the camera module 400.

In an implementation, the second ink layer 520 defines a second through hole 520A, the second through hole 520A faces the first through hole 510A. A diameter h1 of the second through hole 520A is greater than a diameter h2 of the first through hole 510A.

In an implementation, since the camera module 400 is symmetrical in structure, when the second through hole 520A is aligned with the first through hole 510A, on the one hand, it is possible to ensure that the second through hole 520A and the first through hole 510A will not block the external light from entering the camera module 400 and as a result, the camera module 400 can have a larger field of view; on the other hand, it is possible to further decrease the size of the first ink layer 510 and the second ink layer 520, helping to reduce a proportion of the first ink layer 510 and the second ink layer 520 occupying the display panel 200, and in turn helping to increase the screen-to-body ratio of the screen assembly 10.

In an implementation, the field of view of the camera module 400 is conical in shape, which diverges from the camera module 400 toward a direction away from the display panel 200. Therefore, when the diameter of the second through hole 520A is greater than the diameter of the first through hole 510A, it is possible to ensure that the second ink layer 520 will not block the external light from entering the camera module 400. At the same time, the second ink layer 520 can also reduce the light leakage of the display panel 200 toward the camera module 400 as well as shield metal wires and the like in the display panel 200. As such, on the one hand, the camera module 400 can have a larger field of view. On the other hand, since the metal wires in the display panel 200 are shielded, internal structures of the display panel 200 are invisible to the users when viewing from the outside of the screen assembly 10, and thus the consistency in the appearance of the screen assembly 10 is improved.

In another implementation, a projection of the first ink layer 510 on the cover plate 300 partially overlaps with a projection of the second ink layer 520 on the cover plate 300. In yet another implementation, the projection of the first ink layer 510 on the cover plate 300 at least partially overlaps with the projection of the second ink layer 520 on the cover plate 300.

In this implementation, when the projection of the first ink layer 510 on the cover plate 300 partially overlaps with the projection of the second ink layer 520 on the cover plate 300, on the one hand, it is possible to ensure that structures below the first ink layer 510 and the second ink layer 520 are completely shielded, which can provide a beautiful and neat appearance of the screen assembly 10; on the other hand, the first ink layer 510 and the second ink layer 520 cooperate with each other to reduce the light leakage of the display panel 200 and the backlight module 100 toward the camera module 400, helping to improve shooting performance of the camera module 400.

In an implementation, the first ink layer 510 has a thickness greater than the second ink layer 520.

In this implementation, the second ink layer 520 is sandwiched between the display panel 200 and the cover plate 300, and mainly used for shielding the wires in the display panel 200. The second ink layer 520 can also be used to block the light leakage of the backlight module 100 and the display panel 200 toward the camera module 400, and shield the structures inside the backlight module 100, so as to prevent the internal structures from being visible to users and affecting the aesthetics and consistency in appearance of the screen assembly 10. To this end, the second ink layer 520 can have a thickness less than a preset value. The first ink layer 510 is sandwiched between the display panel 200 and the backlight module 100. One the one hand, the first ink layer 510 can shield the structures inside the backlight module 100, which is conductive to the aesthetics of the screen assembly 10. On the other hand, the first ink layer 510 is disposed closer to the camera module 400 than the second ink layer 520, to sufficiently block the light leakage of the backlight module 100 and the display panel 200 toward the camera module 400, the first ink layer 510 can have a thickness greater than the preset value, thereby helping to increase the field of view of the camera module 400. To this end, the first ink layer 510 can have a thickness greater than the preset value to better block the light leakage of the backlight module 100 and the display panel 200 toward the camera module 400, and it is conductive to improve the aesthetics and the consistency in appearance of the screen assembly 10.

In another implementation, the second ink layer 520 is disposed on a surface of the cover plate 300 close to the display panel 200, that is, the second ink layer 520 is coated on the cover plate 300. On the one hand, the second ink layer 520 can block the light leakage of the display panel 200 and the backlight module 100 toward the camera module 400, and on the other hand, the second ink layer 520 can block light reflected by the display panel 200, the backlight module 100, and the camera module 400 from passing through the cover plate 300. If the light reflected by the display panel 200, the backlight module 100, and the camera module 400 passes through the cover plate 300 to enter eyes of the user, internal structures of the screen assembly 10 are visible to the user, which is unfavorable for the aesthetics and the consistency in the appearance of the screen assembly 10.

Alternatively, the second ink layer 520 is disposed on a surface of the display panel 200 close to the cover plate 300, that is, the second ink layer 520 is coated on the display panel 200. On the one hand, the second ink layer 520 can block the light leakage of the display panel 200 and the backlight module 100 toward the camera module 400, and on the other hand, the second ink layer 520 can block the light reflected by the display panel 200, the backlight module 100, and the camera module 400 from passing through the cover plate 300. If the light reflected by the display panel 200, the backlight module 100, and the camera module 400 passes through the cover plate 300 to enter the eyes of the user, the internal structures of the screen assembly 10 are visible to the user, which is unfavorable for the aesthetics and the consistency in the appearance of the screen assembly 10.

In an implementation, the first ink layer 510 is disposed on the surface of the display panel 200 close to the backlight module 100. When the first ink layer 510 is coated on the surface of the display panel 200, on the one hand, the first ink layer 510 can block the light leakage of the backlight module 100 toward the camera module 400, and on the other hand, the first ink layer 510 can block the light reflected by the backlight module 100 and the camera module 400 from passing through the cover plate 300. If the light reflected by the backlight module 100 and the camera module 400 passes through the display panel 200 and the cover plate 300 and enters the eyes of the user, the internal structures of the screen assembly 10 are visible to the user, which is unfavorable for the aesthetics and the consistency in the appearance of the screen assembly 10.

Alternatively, the first ink layer 510 is disposed on the surface of the backlight module 100 close to the display panel 200. When the first ink layer 510 is coated on the surface of the backlight module 100, on the one hand, the first ink layer 510 can block the light leakage of the backlight module 100 toward the camera module 400, and on the other hand, the first ink layer 510 can block the light reflected by the backlight module 100 and the camera module 400 from passing through the cover plate 300. If the light reflected by the backlight module 100 and the camera module 400 passes through the display panel 200 and the cover plate 300 and enters the eyes of the user, the internal structures of the screen assembly 10 are visible to the user, which is unfavorable for the aesthetics and the consistency in the appearance of the screen assembly 10.

In the screen assembly 10 according to the disclosure, the first ink layer 510 is sandwiched between the backlight module 100 and the display panel 200, the second ink layer 520 is sandwiched between the display panel 200 and the cover plate 300. The first ink layer 510 can block the light leakage of the backlight module 100 toward the camera module 400 as well as shield the internal structures of the backlight module 100. The second ink layer 520 can block the light leakage of the display panel 200 and the backlight module 100 toward the camera module 400 as well as shield the internal structures of the display panel 200 and the backlight module 100. As such, the camera module 400 can have a larger field of view and the shooting performance of the camera module 400 is improved. Moreover, it is possible to avoid the internal structures of the display panel 200 and the backlight module 100 from being visible to the users through the cover plate 300 and affecting the consistency in the appearance of the screen assembly 10. Furthermore, the technical solutions of the disclosure help to improve the screen-to-body of the screen assembly 10.

Figure 2:
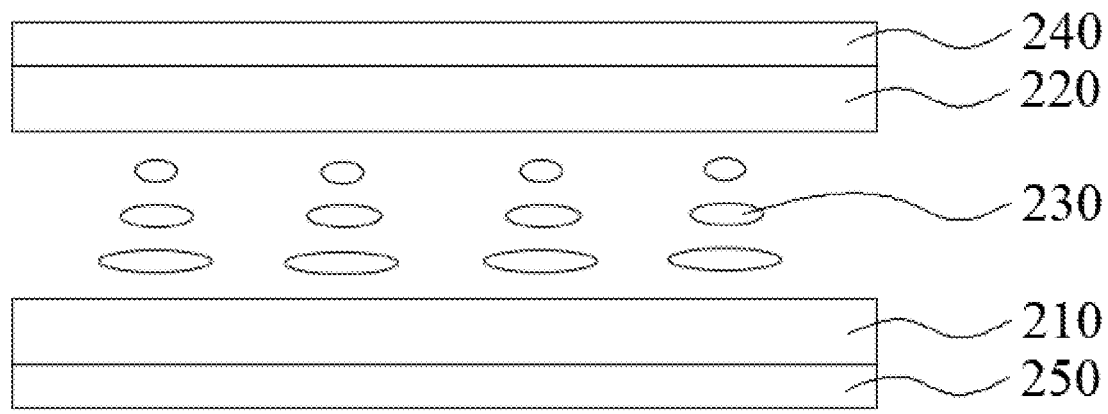
FIG. 2 is a schematic structural view of a display panel according to an implementation of the disclosure.

FIG. 2 is a schematic structural view of the display panel 200 according to an implementation of the disclosure. The screen assembly 10 in this implementation is substantially identical with the screen assembly 10 illustrated in FIG. 1A in structure, except in FIG. 2, the display panel 200 includes an array substrate 210, a color filter substrate 220 opposite to the array substrate 210, and a liquid crystal layer 230 sandwiched between the array substrate 210 and the color filter substrate 220. The display panel 200 further includes a first polarizer 240 and a second polarizer 250. The first polarizer 240 is disposed on a side of the color filter substrate 220 away from the array substrate 210. The second polarizer 250 is disposed on a side of the array substrate 210 away from the color filter substrate 220. The second ink layer 520 directly opposites at least part of the first polarizer 240 and the second polarizer 250.

In an implementation, the second ink layer 520 covers a part of the first polarizer 240 and a part of the second polarizer 250. On one hand, the second ink layer 520 can block the light leakage of the first polarizer 240 and the second polarizer 250 toward the camera module 400, which helps to improve the shooting performance of the camera module 400. On the other hand, the second ink layer 520 can block the light reflected by the display panel 200 and the backlight module 100 from passing through the cover plate 300. If the light reflected by the display panel 200 and the backlight module 100 passes through the cover plate 300 to enter the eyes of the user, the internal structures of the display panel 200 and the backlight module 100 are visible to the user, which is unfavorable for the aesthetics and the consistency in the appearance of the screen assembly 10.

Figure 3:
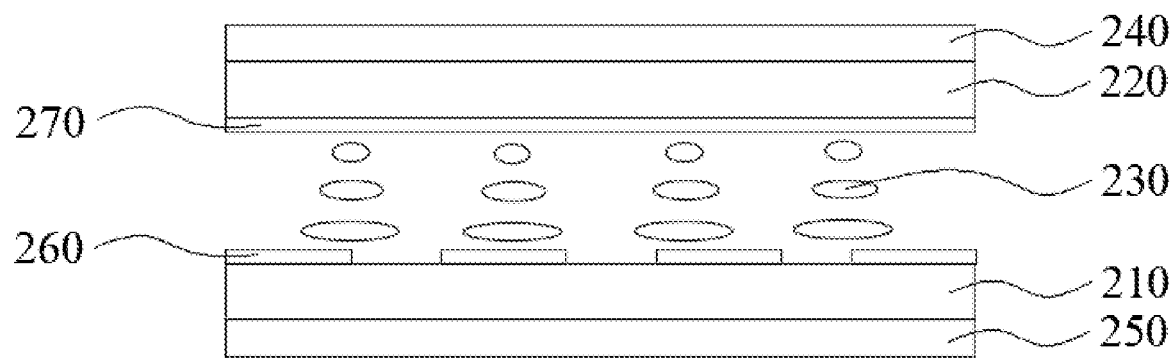
FIG. 3 is a schematic structural view of a display panel according to an implementation of the disclosure.

FIG. 3 is a schematic structural view of the display panel 200 according to an implementation of the disclosure. The display panel 200 illustrated in FIG. 3 is substantially identical with the display panel 200 illustrated in FIG. 2 in structure, except in FIG. 3, the display panel 200 further includes a pixel electrode 260 and a common electrode 270. The pixel electrode 260 is disposed on a surface of the array substrate 210 close to the color filter substrate 220. The common electrode 270 is disposed on a surface of the color filter substrate 220 close to the pixel electrode 260. The second ink layer 520 directly opposites at least part of the pixel electrode 260 and the common electrode 270.

In an implementation, the second ink layer 520 covers a part of the pixel electrode 260 and a part of the common electrode 270. On one hand, the second ink layer 520 can block the light leakage of the pixel electrode 260 and the common electrode 270 toward the camera module 400, which helps to improve the shooting performance of the camera module 400. On the other hand, the second ink layer 520 can block the light reflected by the display panel 200 and the backlight module 100 from passing through the cover plate 300. If the light reflected by the display panel 200 and the backlight module 100 passes through the cover plate 300 to enter the eyes of the user, the internal structures of the display panel 200 and the backlight module 100 are visible to the user, which is unfavorable for the aesthetics and the consistency in the appearance of the screen assembly 10.

Figure 4:
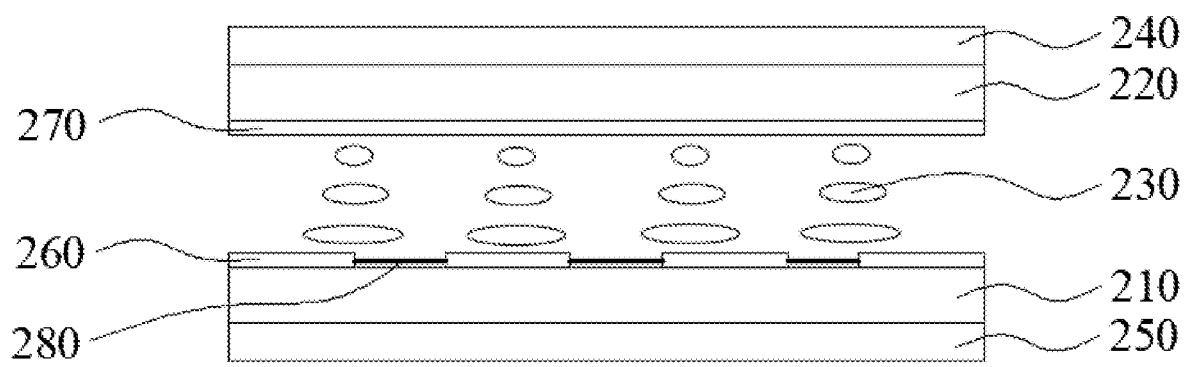
FIG. 4 is a schematic structural view of a display panel according to an implementation of the disclosure.

Referring to FIG. 1A and FIG. 4, FIG. 4 is a schematic structural view of the display panel 200 according to an implementation of the disclosure. The display panel 200 illustrated in FIG. 4 is substantially identical with the display panel 200 illustrated in FIG. 3 in structure, except in FIG. 4, the display panel 200 further includes metal traces 280. The metal traces 280 are electrically coupled with the pixel electrode 260 for signal provision (such as, data signal provision, scanning signal provision, and the like) to the pixel electrode 260. The second ink layer 520 faces a part of the metal traces 280.

In an implementation, the second ink layer 520 covers a part of the metal traces 280. The second ink layer 520 can block the light reflected by the metal traces 280 and the backlight module 100 from passing through the cover plate 300. If the light reflected by the metal traces 280 and the backlight module 100 passes through the cover plate 300 to enter the eyes of the user, internal structures of the metal traces 280 and the internal structures of the backlight module 100 are visible to the user, which is unfavorable for the aesthetics and the consistency in the appearance of the screen assembly 10.

Figure 5:
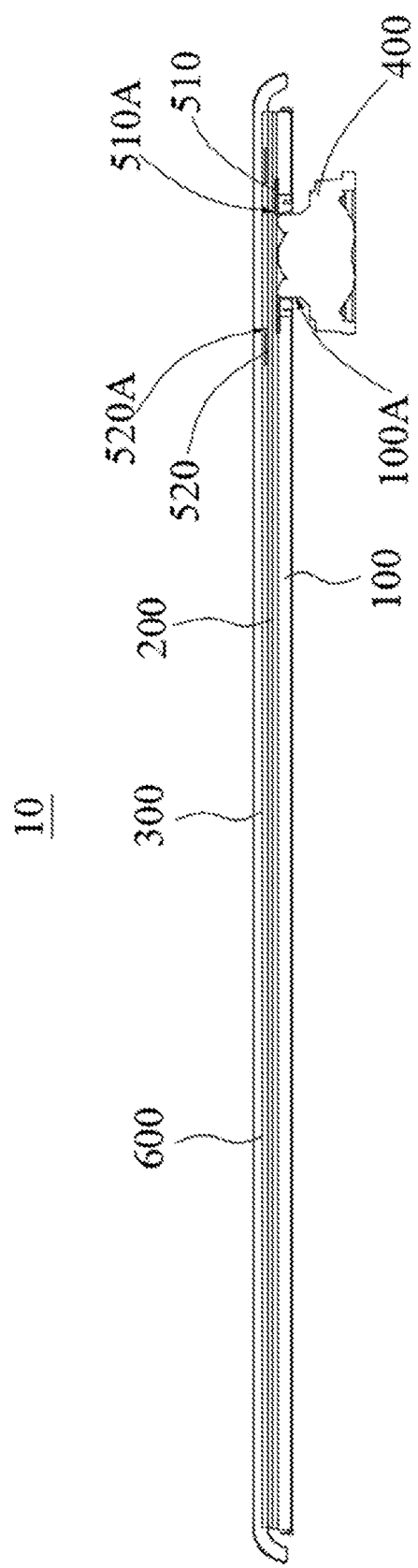
FIG. 5 is a schematic structural view of a screen assembly according to an implementation of the disclosure.

FIG. 5 is a schematic structural view of the screen assembly 10 according to an implementation of the disclosure. The screen assembly 10 illustrated in FIG. 5 further includes an optically clear adhesive (OCA) 600. The optically clear adhesive 600 is sandwiched between the display panel 200 and the cover plate 300, and is used for fixedly connecting the cover plate 300 and the display panel 200.

The optically clear adhesive 600 is a special adhesive used for bonding transparent optical elements. The OCA has advantages of high clarity, high light transmittance (a total light transmittance is greater than 99%), high adhesion, high weather resistance, water resistance, high temperature resistance, ultra violet (UV) resistance and the like. The OCA is a layer of special double-sided adhesive with optical transparency and no substrate. The optically clear adhesive 600, which is sandwiched between the cover plate 300 and the display panel 200, can fixedly connect the cover plate 300 and the display panel 200, and can achieve sealing to protect the display panel 200 from water and dust.

In an implementation, the optically clear adhesive 600 is coated on the surface of the cover plate 300 close to the display panel 200. In another implementation, the optically clear adhesive 600 is coated on the surface of the display panel 200 close to the cover plate 300.

Figure 6A:
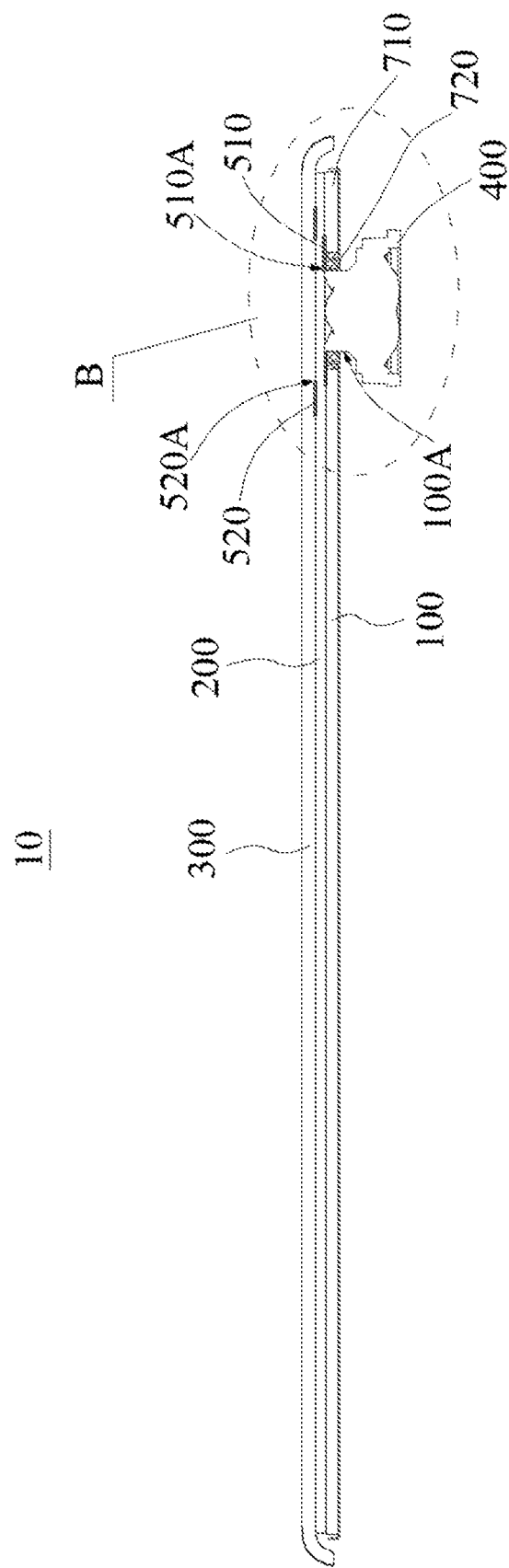
FIG. 6A is a schematic structural view of a screen assembly according to an implementation of the disclosure.
Figure 6B:
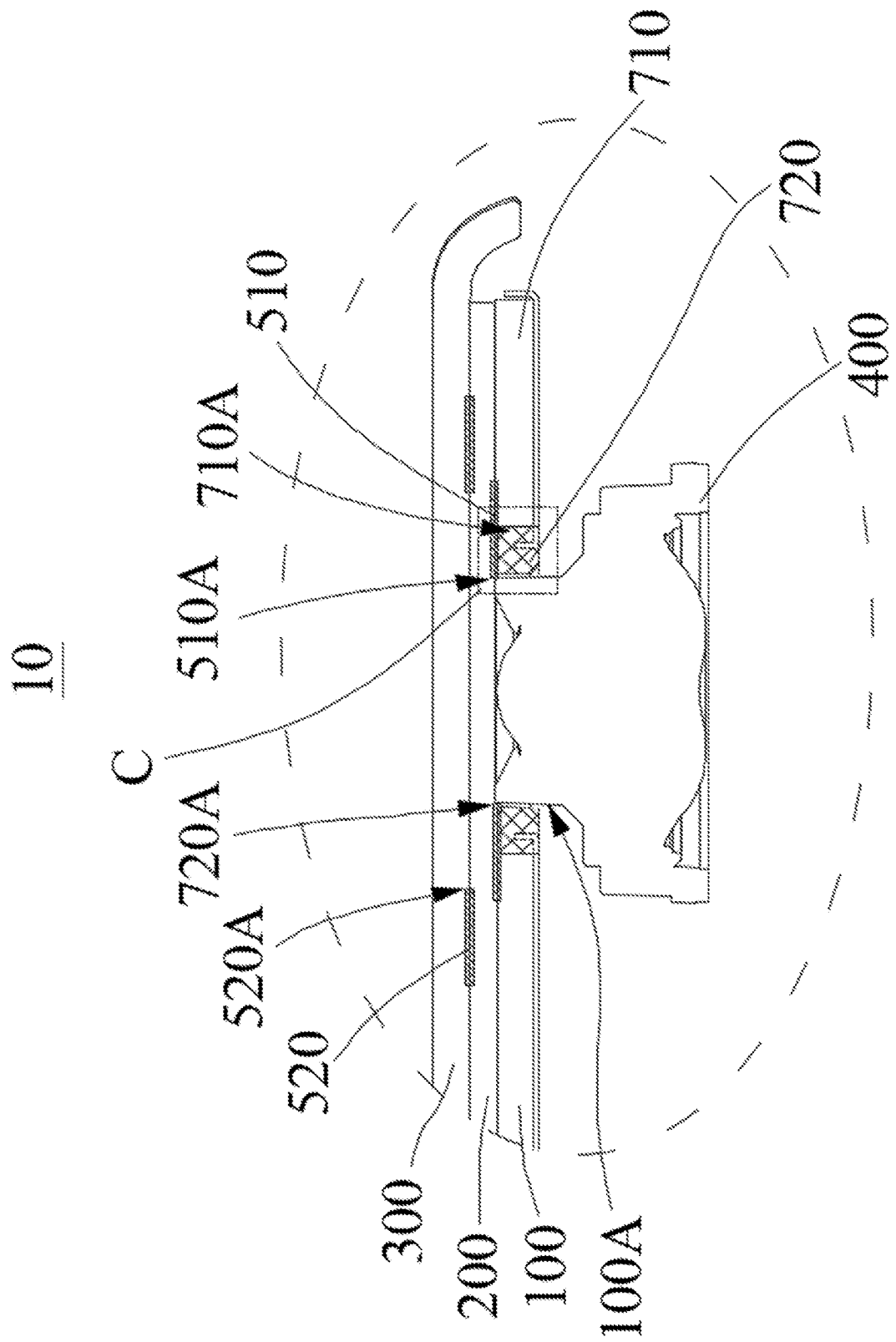
FIG. 6B is a schematic structural view of region B illustrated in FIG. 6A.
Figure 6C:
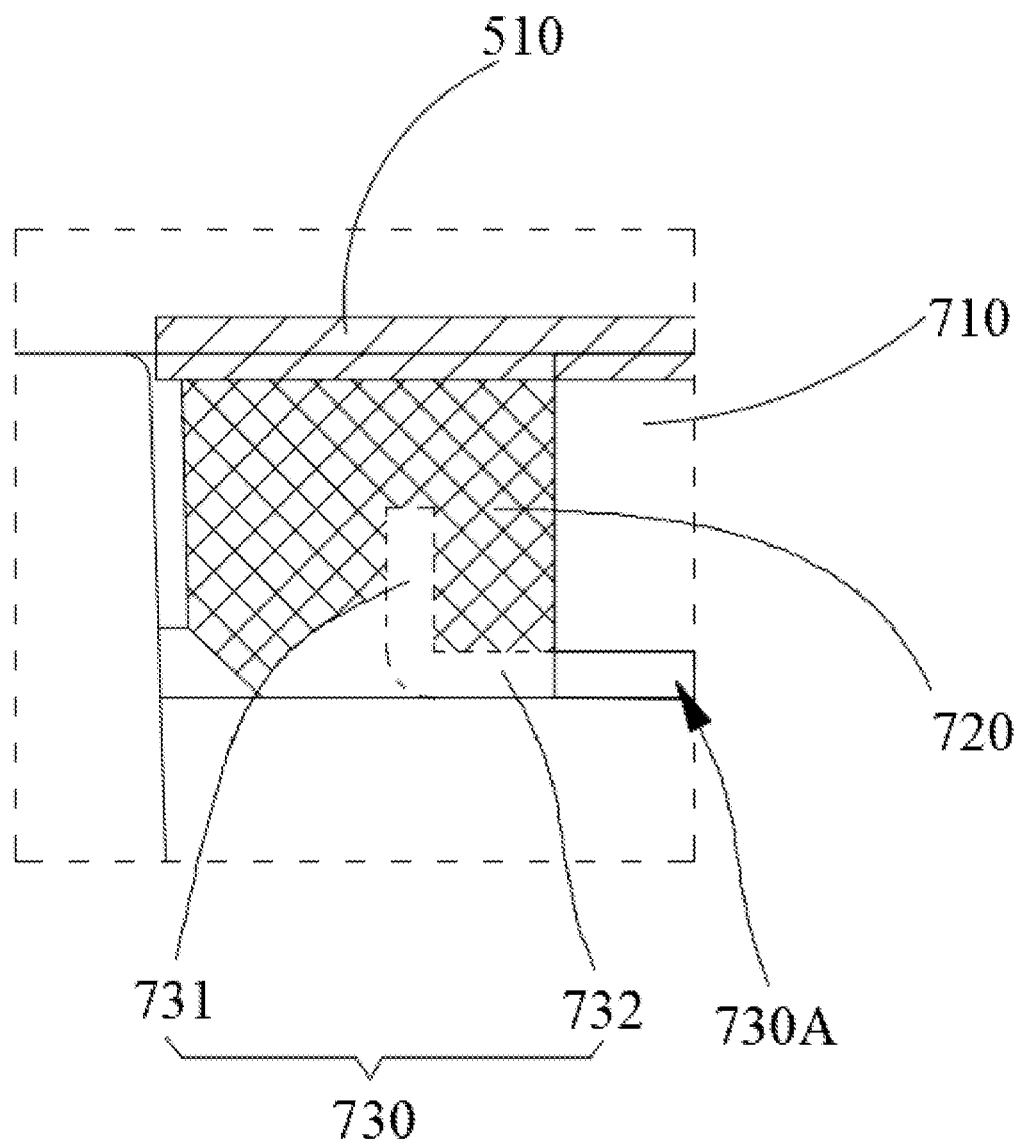
FIG. 6C is a schematic structural view of region C illustrated in FIG. 6A.

FIG. 6A is a schematic structural view of the screen assembly 10 according to an implementation of the disclosure. FIG. 6B is a schematic structural view of region B illustrated in FIG. 6A. FIG. 6C is a schematic structural view of region C illustrated in FIG. 6A. The screen assembly 10 in this implementation is substantially identical with the screen assembly 10 illustrated in FIG. 1A in structure, except in FIG. 6A, the backlight module 100 includes a light guide plate 710 and a plastic ring 720. The light guide plate 710 defines a first via 710A. The plastic ring 720 is received in the first via 710A. The plastic ring 720 defines a third through hole 720A served as the mounting through hole 100A. The third through hole 720A is in clearance fit with the camera module 400.

In an implementation, the first ink layer 510 faces a part of the plastic ring 720.

In this implementation, the backlight module 100 further includes a metal frame 730. The metal frame 730 includes a support ring 731. The support ring 731 is received in the first via 710A. The plastic ring 720 is fixedly connected with the support ring 731 and received in the first via 710A. The plastic ring 720 defines an opening, and the opening is served as the mounting through hole 100A. The plastic ring 720 and the support ring 731 cooperate with each other to limit the camera module 400.

In an implementation, the metal frame 730 is served as a supporting member to support and fix the light guide plate 710.

In an implementation, the support ring 731 is embedded in the plastic ring 720. The plastic ring 720 is in clearance fit with the camera module 400, with a gap of about 0.05 mm there between. When the camera module 400 is at least partially received in the opening of the plastic ring 720, it is possible to finely adjust a position of the camera module 400, such that the camera module 400 can have a larger field of view, helping to improve the shooting performance of the camera module 400. When the camera module 400 is in a proper position, the support ring 731 can limit and fix the camera module 400 to prevent offset of the camera module 400 due to slight shaking and affecting shooting. This technical solution can realize positioning of the camera module 400 without complicated structures, helping to reduce costs.

Furthermore, the metal frame 730 further includes a support plate 732. The support ring 731 protrudes from a surface of the support plate 732. The metal frame 730 defines a second via 730A extending through the support plate 732 and the support ring 731. The support plate 732 is used for carrying the light guide plate 710.

In an implementation, the metal frame 730 is formed with a flange structure. The metal frame 730 includes a base served as the support plate 732 and a protrusion portion served as the support ring 731. The metal frame 730 defines the second via 730A, and the second via 730A passes through the support plate 732 and the support ring 731. The support plate 732 supports the light guide plate 710 to avoid displacement of the light guide plate 710. The support ring 731 is sleeved on the side wall of the camera module 400 to limit the camera module 400.

Figure 7:
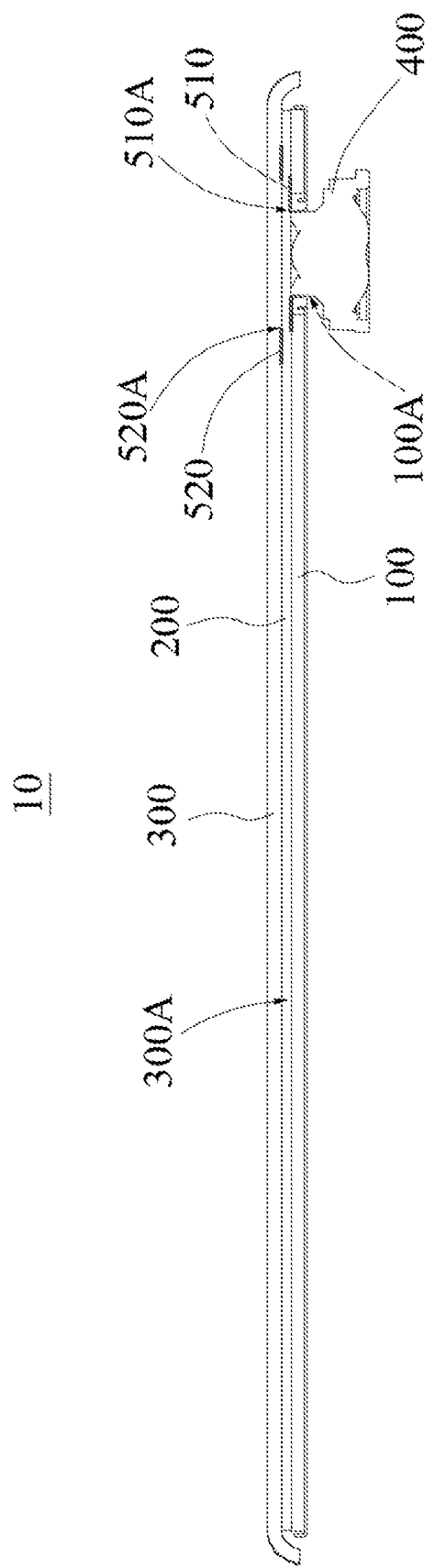
FIG. 7 is a schematic structural view of a screen assembly according to an implementation of the disclosure.

FIG. 7 is a schematic structural view of the screen assembly 10 according to an implementation of the disclosure. In this implementation, the screen assembly 10 includes the backlight module 100, the display panel 200, the cover plate 300, and the camera module 400. The display panel 200 has a display region 300A. The backlight module 100 and the camera module 400 are disposed corresponding to the display region 300A. The backlight module 100 defines the mounting through hole 100A. The camera module 400 partially extends through the mounting through hole 100A. The screen assembly 10 further includes the first ink layer 510 and the second ink layer 520. The first ink layer 510 can block the light leakage of the backlight module 100 and the display panel 200 toward the camera module 400. The second ink layer 520 can block the light leakage of the display panel 200 toward the camera module 400.

In an implementation, the display panel 200 is a liquid crystal display panel. The camera module 400 is a front camera.

In this implementation, the backlight module 100 and the camera module 400 are disposed corresponding to the display region 300A of the display panel 200. The first ink layer 510 is sandwiched between the backlight module 100 and the display panel 200 and located at a position corresponding to the display region 300A of the display panel 200. Thus, it is possible to reduce the area of the non-display region of the display panel 200 and obtain a large screen-to-body ratio of the screen assembly 10. In an implementation, when the camera module 400 is located at a position corresponding to the display region 300A of the display panel 200, there is no need to reserve an area for the camera module 400 in a non-display region of the display panel 200, thus reducing an area of the non-display region of the display panel 200 and therefore increasing a screen-to-body ratio of the screen assembly 10. Furthermore, on the one hand, the first ink layer 510 can shield structures in the backlight module 100 that do not need to be visible to the user, which is conductive to the aesthetics of the screen assembly 10. On the other hand, the first ink layer 510 can block the light leakage of the display panel 200 and the backlight module 100 toward the camera module 400, helping to increase the field of view of the camera module 400. Moreover, when the first ink layer 510 is located in the display region 300A of the display panel 200, it is beneficial to improve the screen-to-body ratio of the screen assembly 10. The second ink layer 520 can block the light leakage of the display panel 200 and the backlight module 100 toward the camera module 400 as well as shield the internal structures of the display panel 200 and the backlight module 100. As such, the camera module 400 can have a larger field of view and the shooting performance of the camera module 400 can be improved. Moreover, it is possible to avoid the internal structures of the display panel 200 and the backlight module 100 from being visible to the user through the cover plate 300 and affecting the consistency in the appearance of the screen assembly 10. Furthermore, the technical solutions of the disclosure help to improve the screen-to-body of the screen assembly 10.

In order for the camera module 400 to receive lights, as one option, when shooting, a part of the display region 300A of the display panel 200 corresponding to the camera module 300 can be controlled to be transparent, such that lights from outside can pass through the transparent part of the display region 300A of the display panel 200 and transmit into the camera module 300. As another option, the part of the display region 300A of the display panel 200 corresponding to camera module 400 can be designed to have no liquid crystal, and upper and lower polarizers (that is, the first polarizer 240 and the second polarizer 250), which define through holes corresponding to the camera module 400, are provided. Alternatively, regions of the upper and lower polarizers corresponding to the camera module 400 are designed to be transparent.

Figure 8:
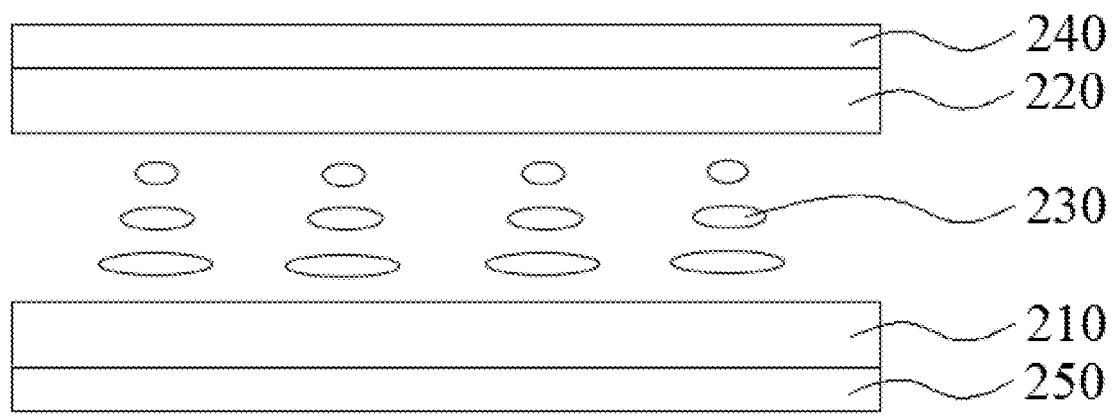
FIG. 8 is a schematic structural view of a display panel according to an implementation of the disclosure.

FIG. 8 is a schematic structural view of the screen assembly 10 according to an implementation of the disclosure. The screen assembly 10 in this implementation is substantially identical with the screen assembly 10 illustrated in FIG. 7 in structure, except in this implementation, the display panel 200 includes the array substrate 210, the color filter substrate 220 opposite to the array substrate 210, and the liquid crystal layer 230 sandwiched between the array substrate 210 and the color filter substrate 220. The display panel 200 further includes the first polarizer 240 and the second polarizer 250. The first polarizer 240 is disposed on the side of the color filter substrate 220 away from the array substrate 210. The second polarizer 250 is disposed on the side of the array substrate 210 away from the color filter substrate 220. The second ink layer 520 is disposed facing the at least part of the first polarizer 240 and the second polarizer 250.

In an implementation, the second ink layer 520 covers a part of the first polarizer 240 and a part of the second polarizer 250. On one hand, the second ink layer 520 can block the light leakage of the first polarizer 240 and the second polarizer 250 toward the camera module 400, which helps to improve the shooting performance of the camera module 400. On the other hand, the second ink layer 520 can block the light reflected by the display panel 200 and the backlight module 100 from passing through the cover plate 300. If the light reflected by the display panel 200 and the backlight module 100 passes through the cover plate 300 to enter the eyes of the user, the internal structures of the display panel 200 and the backlight module 100 are visible to the user, which is unfavorable for the aesthetics and the consistency in the appearance of the screen assembly 10.

Figure 9:
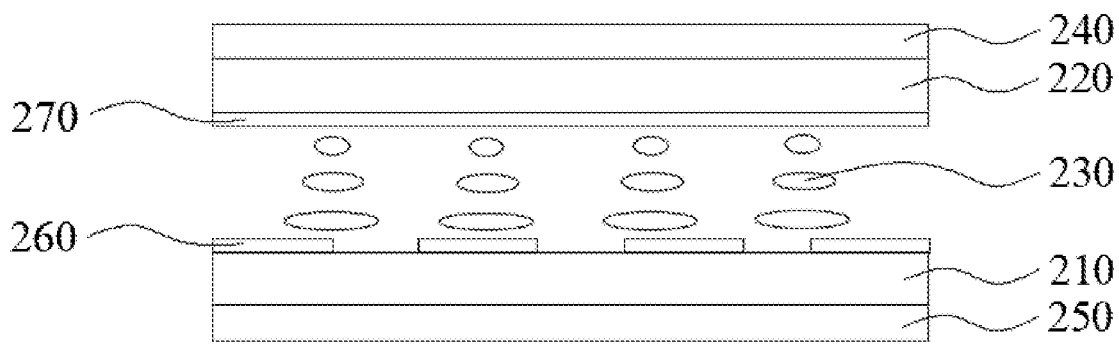
FIG. 9 is a schematic structural view of a display panel according to an implementation of the disclosure.

FIG. 9 is a schematic structural view of the screen assembly 10 according to an implementation of the disclosure. The display panel 200 illustrated in FIG. 9 is substantially identical with the display panel 200 illustrated in FIG. 8 in structure, except in FIG. 9, the display panel 200 further includes the pixel electrode 260 and the common electrode 270. The pixel electrode 260 is disposed on the surface of the array substrate 210 close to the color filter substrate 220. The common electrode 270 is disposed on the surface of the color filter substrate 220 close to the pixel electrode 260. The second ink layer 520 is disposed facing at least part of the pixel electrode 260 and the common electrode 270.

In an implementation, the second ink layer 520 covers a part of the pixel electrode 260 and a part of the common electrode 270. On one hand, the second ink layer 520 can block the light leakage of the pixel electrode 260 and the common electrode 270 toward the camera module 400, which helps to improve the shooting performance of the camera module 400. On the other hand, the second ink layer 520 can block the light reflected by the display panel 200 and the backlight module 100 from passing through the cover plate 300. If the light reflected by the display panel 200 and the backlight module 100 passes through the cover plate 300 to enter the eyes of the user, the internal structures of the display panel 200 and the backlight module 100 are visible to the user, which is unfavorable for the aesthetics and the consistency in the appearance of the screen assembly 10.

Figure 10:
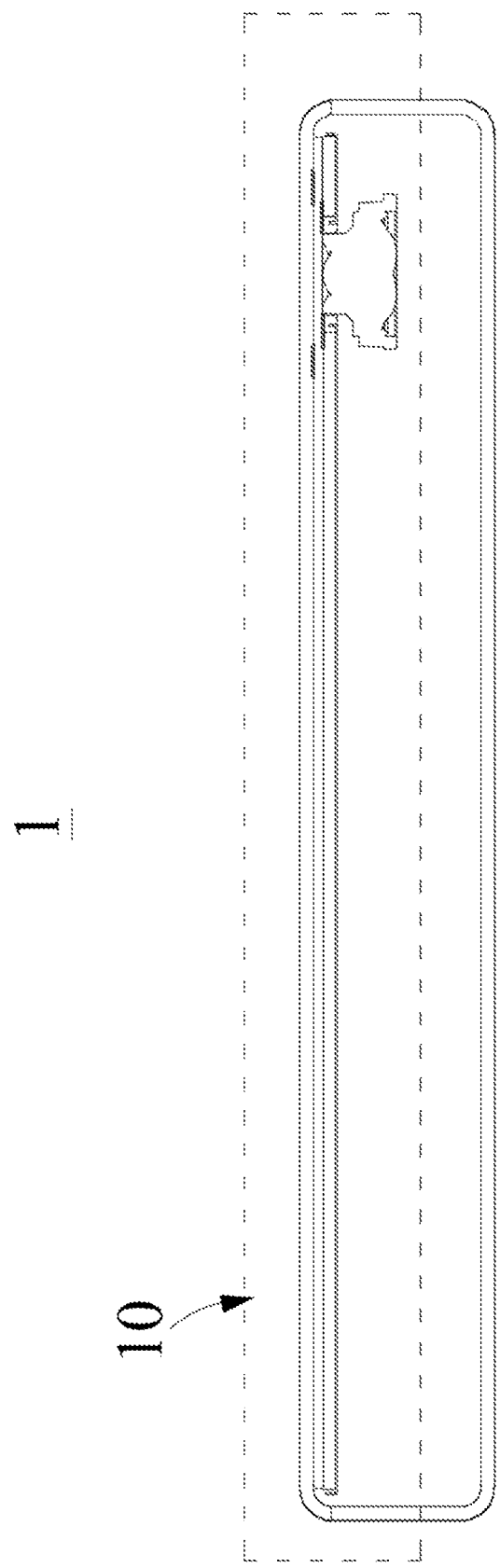
FIG. 10 is a schematic structural view of an electronic device according to an implementation of the disclosure.

FIG. 10 is a schematic structural view of an electronic device 1 according to an implementation of the disclosure. The electronic device 1 includes the screen assembly 10 provided according to any of the above-mentioned implementation.

The electronic device 1 may be any device with a shooting function. The electronic device 1 may be a smart device with network functions such as a tablet computer, a mobile phone, an e-reader, a remote control, a personal computer (PC), a notebook computer, a vehicle-mounted device, a network TV, a wearable device, and the like.

Figure 11:
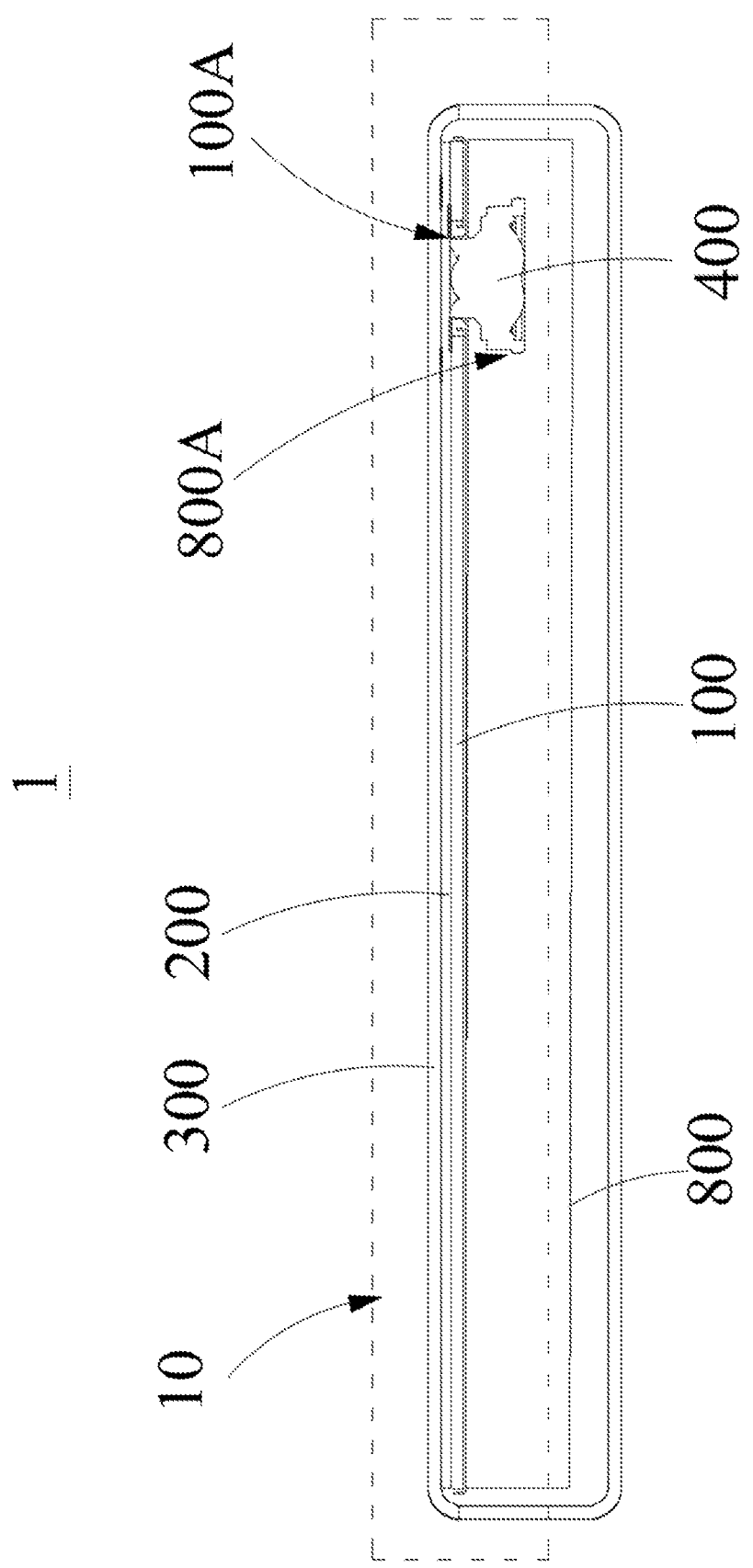
FIG. 11 is a schematic structural view of an electronic device according to an implementation of the disclosure.

FIG. 11 is a schematic structural view of the electronic device 1 according to an implementation of the disclosure. The electronic device 1 illustrated in FIG. 11 is substantially identical with the electronic device 1 illustrated in FIG. 10 in structure, except in FIG. 11, the electronic device 1 further includes a front housing 800 for carrying the screen assembly 10. The front housing 800 is disposed on one of two opposite sides of the backlight module 100, and the display panel 200 is disposed on the other one of the two opposite sides of the backlight module 100. The front housing 800 defines a receiving cavity 800A at a position corresponding to the mounting through hole 100A, the receiving cavity 800A is used for receiving the camera module 400 to limit the camera module 400. It is noted that, as illustrated in FIG. 11, when the camera module 400 is received in the receiving cavity 800A, an inner wall of the receiving cavity 800A fits with an outer contour of the camera module 400.

In an implementation, the front housing 800 is served as a frame of the electronic device 1. The front housing 800 defines a receiving cavity 800A facing the mounting through hole 100A. The receiving cavity 800A is used for receiving the camera module 400 to limit the camera module 400. In this technical solution, the receiving cavity 800A is defined in the front housing 800 to limit the camera module 400, such that the camera module 400 can be fixed without complicated mechanical structures, which is beneficial to reduce the costs.

Figure 12:
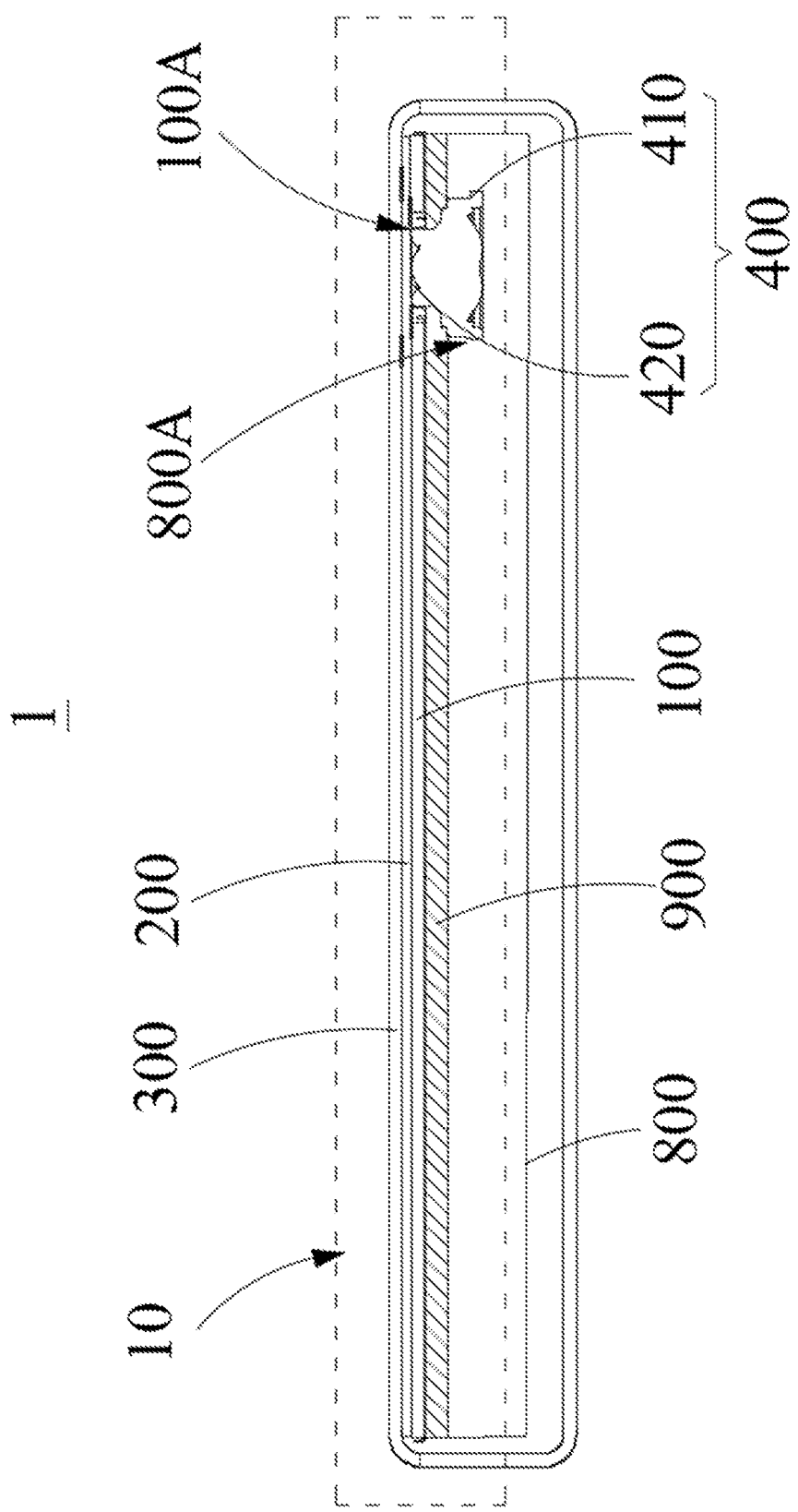
FIG. 12 is a schematic structural view of an electronic device according to an implementation of the disclosure.

FIG. 12 is a schematic structural view of the electronic device 1 according to an implementation of the disclosure. The screen assembly 10 illustrated in FIG. 12 is substantially identical with the screen assembly 10 illustrated in FIG. 11 in structure, except in FIG. 12, the electronic device 1 further includes a sealing layer 900. The camera module 400 includes an outer housing 410 and optical elements 420 received in the outer housing 410. The sealing layer 900 is sandwiched between the backlight module 100 and the front housing 800, and is attached to the outer housing 410 to seal and protect the optical elements 420 of the camera module 400.

In an implementation, the sealing layer 900 may be waterproof foam. The sealing layer 900 is used for protecting the electronic device 1 from water and dust, which is beneficial to prolong a service life of the electronic device 1. Furthermore, in addition to waterproofing, dustproofing, and sealing, the sealing layer 900 is also used for shock absorption, sound absorption, and cushioning, and the like. It is possible to avoid unintended vibration of the camera module 400, to absorb noise generated inside the electronic device 1, and to provide buffer protection for the electronic device 1, and so on.

Disclosed above are merely specific implementations of the disclosure, but the protection scope of the disclosure is not limited thereto. Within the technical scope disclosed in the disclosure, various equivalent modifications or substitutions shall be readily appreciated by those skilled in the art and within the protection scope of the disclosure. Therefore, the protection scope of the disclosure shall be subject to the protection scope of the claims.

What is claimed is:

1. A screen assembly, comprising:
   a cover plate;
   a display panel;
   a camera module;
   a backlight module defining a mounting through hole for at least partially receiving the camera module, wherein the cover plate, the display panel, and the backlight module are stacked in sequence;
   a first ink layer sandwiched between the backlight module and the display panel; and
   a second ink layer sandwiched between the display panel and the cover plate;
   wherein the first ink layer and the second ink layer cooperate with each other to block light leakage of the display panel and the backlight module toward the camera module.

2. The screen assembly of claim 1, wherein the first ink layer defines a first through hole, the camera module extends through the first through hole and is attached to an inner wall of the first through hole.

3. The screen assembly of claim 2, wherein the second ink layer defines a second through hole, wherein the second through hole directly opposites the first through hole.

4. The screen assembly of claim 3, wherein the second through hole has a diameter greater than the first through hole.

5. The screen assembly of claim 1, wherein a projection of the first ink layer on the cover plate partially overlaps with a projection of the second ink layer on the cover plate.

6. The screen assembly of claim 5, wherein the first ink layer has a thickness greater than the second ink layer.

7. The screen assembly of claim 5, wherein
   the display panel comprises an array substrate, a color filter substrate opposite to the array substrate, and a liquid crystal layer sandwiched between the array substrate and the color filter substrate;
   the display panel further comprises a first polarizer and a second polarizer, wherein the first polarizer is disposed on a side of the color filter substrate away from the array substrate, and the second polarizer is disposed on a side of the array substrate away from the color filter substrate; and
   the second ink layer directly opposites at least part of the first polarizer and the second polarizer.

8. The screen assembly of claim 7, wherein
   the display panel further comprises a pixel electrode and a common electrode, wherein the pixel electrode is disposed on a surface of the array substrate close to the color filter substrate, and the common electrode is disposed on a surface of the color filter substrate close to the pixel electrode; and
   the second ink layer directly opposites at least part of the pixel electrode and the common electrode.

9. The screen assembly of claim 8, wherein
   the display panel further comprises metal traces, and the metal traces are electrically coupled with the pixel electrode for signal provision to the pixel electrode; and
   the second ink layer directly opposites a part of the metal traces.

10. The screen assembly of claim 7, wherein an optically clear adhesive is sandwiched between the display panel and the cover plate, and is used for fixedly connecting the cover plate and the display panel.

11. The screen assembly of claim 5, wherein
    the backlight module comprises a light guide plate and a plastic ring;
    the light guide plate defines a first via, and the plastic ring is received in the first via; and
    the plastic ring defines a third through hole served as the mounting through hole, and the third through hole is in clearance fit with the camera module.

12. The screen assembly of claim 11, wherein the first ink layer directly opposites a part of the plastic ring.

13. The screen assembly of claim 12, wherein
    the backlight module further comprises a metal frame, and the metal frame comprises a support ring received in the first via;
    the plastic ring is fixedly connected with the support ring and received in the first via;
    the plastic ring defines an opening, and the opening is served as the mounting through hole; and
    the plastic ring and the support ring cooperate with each other to limit the camera module.

14. The screen assembly of claim 13, wherein
    the metal frame further comprises a support plate, the support ring protrudes from a surface of the support plate;
    the metal frame defines a second via extending through the support plate and the support ring; and
    the support plate is used for carrying the light guide plate.

15. A screen assembly, comprising:
    a cover plate;
    a backlight module defining a mounting through hole;
    a camera module partially extending through the mounting through hole;
    a display panel comprising a display region, wherein the backlight module and the camera module are disposed corresponding to the display region;
    a first ink layer configured to block light leakage of the backlight module and the display panel toward the camera module; and
    a second ink layer configured to block light leakage of the display panel toward the camera module.

16. The screen assembly of claim 15, wherein
    the display panel comprises an array substrate, a color filter substrate opposite to the array substrate, and a liquid crystal layer sandwiched between the array substrate and the color filter substrate;
    the display panel further comprises a first polarizer and a second polarizer, wherein the first polarizer is disposed on a side of the color filter substrate away from the array substrate, and the second polarizer is disposed on a side of the array substrate away from the color filter substrate; and
    the second ink layer directly opposites at least part of the first polarizer and the second polarizer.

17. The screen assembly of claim 16, wherein
    the display panel further comprises a pixel electrode and a common electrode, wherein the pixel electrode is disposed on a surface of the array substrate close to the color filter substrate, and the common electrode is disposed on a surface of the color filter substrate close to the pixel electrode; and the second ink layer directly opposites at least part of the pixel electrode and the common electrode.

18. An electronic device, comprising:

a screen assembly comprising:
   a cover plate;
   a display panel;
   a camera module;
   a backlight module defining a mounting through hole for at least partially receiving the camera module, wherein the cover plate, the display panel, and the backlight module are stacked in sequence;
   a first ink layer sandwiched between the backlight module and the display panel; and
   a second ink layer sandwiched between the display panel and the cover plate, wherein the first ink layer and the second ink layer cooperate with each other to block light leakage of the display panel and the backlight module toward the camera module; and a front housing for carrying the screen assembly.

19. The electronic device of claim 18, wherein the front housing and the display panel are respectively disposed on two opposite sides of the backlight module; and the front housing defines a receiving cavity at a position corresponding to the mounting through hole, wherein the receiving cavity is used for receiving the camera module to limit the camera module.

20. The electronic device of claim 19, wherein the electronic device further comprises a sealing layer;

the camera module comprises an outer housing and optical elements received in the outer housing; and the sealing layer is sandwiched between the backlight module and the front housing, and is attached to the outer housing to seal and protect the optical elements of the camera module.

\* \* \* \* \*